United States Patent
Miyake et al.

(10) Patent No.: US 10,341,550 B2
(45) Date of Patent: Jul. 2, 2019

(54) END FACE INSPECTION APPARATUS AND FOCUSED IMAGE DATA ACQUISITION METHOD

(71) Applicant: ANRITSU CORPORATION, Kanagawa (JP)

(72) Inventors: Yasuhiro Miyake, Kanagawa (JP); Taichi Murakami, Kanagawa (JP); Masayuki Shinohara, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 1 day.

(21) Appl. No.: 15/797,457

(22) Filed: Oct. 30, 2017

(65) Prior Publication Data
US 2018/0152617 A1 May 31, 2018

(30) Foreign Application Priority Data

Nov. 28, 2016 (JP) .................................. 2016-229888
Nov. 28, 2016 (JP) .................................. 2016-229889

(51) Int. Cl.
*G01M 11/00* (2006.01)
*H04N 5/232* (2006.01)
(Continued)

(52) U.S. Cl.
CPC ........ *H04N 5/23212* (2013.01); *G01M 11/31* (2013.01); *G01M 11/3145* (2013.01);
(Continued)

(58) Field of Classification Search
CPC ...... H04N 5/23212; G02B 6/385; G02B 6/00; G06T 7/0002; G06T 7/0004;
(Continued)

(56) References Cited

U.S. PATENT DOCUMENTS 5,179,419 A * 1/1993 Palmquist ............ G01N 21/952
356/237.2
5,809,162 A * 9/1998 Csipkes ............... G02B 6/3818
348/125

(Continued)

FOREIGN PATENT DOCUMENTS

JP 2003-214978 A 7/2003
JP 2004-077376 A 3/2004
(Continued)

OTHER PUBLICATIONS

Taichi Murakami, et al., "Development of MT9083 Access Master Fiber Visualizer and Connector Inspection Functions" Anritsu Technical, No. 90, Mar. 2014, pp. 1-8, Japan.

*Primary Examiner* — Hung H Lam
(74) *Attorney, Agent, or Firm* — Pearne & Gordon LLP

(57) ABSTRACT

An end face inspection apparatus which inspects an end face of an test object, and includes optical system causing an image acquisition unit to form an image of an end face of a held test object, focusing degree changing means for changing a distance between the end face of the test object and a focal position of the optical system, and a control unit processing image data acquired in the image acquisition unit. The end face inspection apparatus acquires a series of image data which is output from the image acquisition unit at a preset time interval while the distance between the end face of the test object and the focal position of the optical system is changed, determines whether or not each piece of the image data is focused, and selects focused image data as image data for end face inspection.

19 Claims, 5 Drawing Sheets

(51) Int. Cl.
*G06T 7/00* (2017.01)
*G02B 6/00* (2006.01)
*G02B 6/38* (2006.01)

(52) U.S. Cl.
CPC ............... *G02B 6/00* (2013.01); *G02B 6/385* (2013.01); *G06T 7/0002* (2013.01); *G06T 7/0004* (2013.01); *G06T 2207/10148* (2013.01); *G06T 2207/30164* (2013.01); *G06T 2207/30168* (2013.01)

(58) Field of Classification Search
CPC . G06T 2207/30168; G06T 2207/10148; G06T 2207/30164; G01M 11/31
See application file for complete search history.

(56) References Cited

U.S. PATENT DOCUMENTS

| | | | |
|---|---|---|---|
| 2004/0004710 A1* | 1/2004 | Katakura | B24B 19/226 356/73.1 |
| 2005/0030553 A1 | 2/2005 | Akishiba | |
| 2012/0320159 A1* | 12/2012 | Torres | G06T 7/0006 348/46 |
| 2013/0229650 A1* | 9/2013 | Wilson | B08B 1/00 356/73.1 |

FOREIGN PATENT DOCUMENTS

| | | |
|---|---|---|
| JP | 2004-286598 A | 10/2004 |
| JP | 2015-082096 A | 4/2015 |

\* cited by examiner

END FACE INSPECTION APPARATUS AND FOCUSED IMAGE DATA ACQUISITION METHOD

TECHNICAL FIELD

The present invention relates to an end face inspection apparatus, and particularly to an end face inspection apparatus inspecting, for example, an end face of an optical connector.

BACKGROUND ART

A terminal end of an optical fiber cable used for various communications is provided with an optical connector for use in relay or connection to other apparatuses. The optical connector includes a cylindrical ferrule of which an optical fiber is inserted into an inner circumferential part, and a plug housing which holds the ferrule and is connected and fixed to other apparatuses or an adaptor for relay.

In the optical connector, if an end face of the ferrule (including the optical fiber) which is a connection portion is scratched or stained, the communication quality of the optical fiber deteriorates. Thus, when an optical fiber cable is connected, an end face inspection apparatus which inspects a state of an end face of a ferrule of a formed optical connector is used.

The end face inspection apparatus captures an image of the end face of the ferrule of the optical connector with an image sensor, and enlarges and observes the captured image so as to find a scratch or a stain.

Non-Patent Document 1 discloses that an operator manually finely adjusts a focus of an image captured with an image sensor, and a focused image is acquired.

However, in such an end face inspection apparatus, an operator is required to manually perform fine adjustment for focusing, and thus time for fine adjustment is taken. The operator is required to perform an operation for acquiring a focused image while viewing an image displayed on a display unit of the end face inspection apparatus, and thus it takes time to acquire a focused image.

In order to cope with such a problem, Patent Document 1 has proposed a technique in which an end face of a ferrule of an optical connector is focused through automatic focusing, and then captured image data is subject to image processing.

RELATED ART DOCUMENT

Patent Document

[Patent Document 1] JP-A-2004-77376

Non-Patent Document

[Non-Patent Document 1] Taichi Murakami, Tatsuyuki Maki, Taiki Fukushima, Tomohide Yamazaki, "The development of Fiber Visualizer and connector inspection function on MT9083 ACCESS Master—A Dramatic Simplification of Field Works—", ANRITSU Technical, No. 89, March 2014

DISCLOSURE OF THE INVENTION

Problem that the Invention is to Solve

However, the end face inspection apparatus uses an automatic focusing mechanism which adjusts a focal position of a lens unit with a motor on the basis of ranging information from a ranging sensor, and thus has a problem that cost increases.

Therefore, an object of the present invention is to provide an end face inspection apparatus which can acquire focused image data of an end face which is a test object with a simple and inexpensive configuration.

Means for Solving the Problem

According to a first aspect of the present invention, there is provided an end face inspection apparatus including an optical system which forms an image of an end face of a held test object on an image acquisition unit, and inspecting the end face of the test object by using acquired image data, the apparatus including focusing degree changing means for changing a distance between the end face of the test object and a focal position of the optical system; and a control unit that acquires a series of image data which is output from the image acquisition unit at a preset time interval while the distance between the end face of the test object and the focal position of the optical system is changed by the focusing degree changing means, determines whether or not each piece of the image data is focused, and selects focused image data as image data for end face inspection.

With this configuration, the image data is acquired at the preset time interval, and it is determined whether or not the image data is focused. Thus, if the focusing degree changing means is operated, and a focal position is moved to the end face vicinity of the test object, image data around the focal position can be acquired, and thus it is possible to acquire focused image data of an end face of a test object with a simple and inexpensive configuration.

According to the end face inspection apparatus of a second aspect of the present invention, in the end face inspection apparatus of the first aspect of the present invention, the test object is fixed to and held at a predetermined position, and the focusing degree changing means is formed of an optical system driving mechanism that moves the focal position of the optical system through an operator's operation.

With this configuration, the image data is acquired at the preset time interval, and it is determined whether or not the image data is focused. Thus, if the optical system driving mechanism is operated, and a focal position is moved to the end face vicinity of the test object, image data around the focal position can be acquired, and thus it is possible to acquire focused image data of an end face of a test object with a simple and inexpensive configuration.

According to the end face inspection apparatus of a third aspect of the present invention, in the end face inspection apparatus of the first aspect of the present invention, the control unit determines whether or not an in-focus state occurs by using part of the image data.

According to the end face inspection apparatus of a fourth aspect of the present invention, in the end face inspection apparatus of the second aspect of the present invention, the control unit determines whether or not an in-focus state occurs by using part of the image data.

With this configuration, it is determined whether or not an in-focus state occurs by referring to part of the image data. Thus, it is possible to reduce a processing load compared with a case where it is determined whether or not an in-focus state occurs by referring to all of image data.

According to the end face inspection apparatus of a fifth aspect of the present invention, in the end face inspection apparatus of the third aspect of the present invention, the control unit detects a shape of the end face of the test object from the image data, and determines whether or not an in-focus state occurs by using a peripheral portion of the shape in a case where the shape is detected.

According to the end face inspection apparatus of a sixth aspect of the present invention, in the end face inspection apparatus of the fourth aspect of the present invention, the control unit detects a shape of the end face of the test object from the image data, and determines whether or not an in-focus state occurs by using a peripheral portion of the shape in a case where the shape is detected.

With this configuration, a shape of the end face is detected from image data, and it is determined whether or not an in-focus state occurs on the basis of a peripheral portion of the shape in a case where the shape is detected. Thus, it is possible to reduce the influence of noise compared with a case where it is determined whether or not an in-focus state occurs by referring to all of image data, and it is possible to determine whether or not an in-focus state occurs only in a case where a test object is present.

According to the end face inspection apparatus of a seventh aspect of the present invention, in the end face inspection apparatus of the second aspect of the present invention, the control unit determines whether or not each piece of the image data which is output from the image acquisition unit at a preset time interval is focused only while the optical system driving mechanism is operated.

According to the end face inspection apparatus of an eighth aspect of the present invention, in the end face inspection apparatus of the third aspect of the present invention, the control unit determines whether or not each piece of the image data which is output from the image acquisition unit at a preset time interval is focused only while the optical system driving mechanism is operated.

According to the end face inspection apparatus of a ninth aspect of the present invention, in the end face inspection apparatus of the fourth aspect of the present invention, the control unit determines whether or not each piece of the image data which is output from the image acquisition unit at a preset time interval is focused only while the optical system driving mechanism is operated.

According to the end face inspection apparatus of a tenth aspect of the present invention, in the end face inspection apparatus of the fifth aspect of the present invention, the control unit determines whether or not each piece of the image data which is output from the image acquisition unit at a preset time interval is focused only while the optical system driving mechanism is operated.

According to the end face inspection apparatus of an eleventh aspect of the present invention, in the end face inspection apparatus of the sixth aspect of the present invention, the control unit determines whether or not each piece of the image data which is output from the image acquisition unit at a preset time interval is focused only while the optical system driving mechanism is operated.

With this configuration, it is determined whether or not image data is focused at a preset time interval only while the optical system driving mechanism is operated. Thus, it is possible to restrict the time for determination of an in-focus state and thus to reduce a processing load.

According to the end face inspection apparatus of a twelfth aspect of the present invention, in the end face inspection apparatus of the first aspect of the present invention, the focusing degree changing means is formed of a holding portion that holds the end face of the test object to face the optical system on an optical axis of the optical system, and moves the end face to pass through the focal position in an optical axis direction of the optical axis at a predetermined speed by using the elastic force of an elastic member.

With this configuration, the end face of the test object is moved so as to pass through a focal position at a predetermined speed, and image data is acquired at a preset time interval and it is determined whether or not the image data is focused during that time. Therefore, image data around a focal position can be acquired, and thus it is possible to acquire focused image data of an end face of a test object with a simple and inexpensive configuration.

According to the end face inspection apparatus of a thirteenth aspect of the present invention, in the end face inspection apparatus of the first aspect of the present invention, the control unit determines whether or not each piece of image data which is output from the image acquisition unit at a preset time interval is focused while the end face of the test object is moved in a direction of becoming distant from the optical system, and selects focused image data.

According to the end face inspection apparatus of a fourteenth aspect of the present invention, in the end face inspection apparatus of the twelfth aspect of the present invention, the control unit determines whether or not each piece of image data which is output from the image acquisition unit at a preset time interval is focused while the end face of the test object is moved in a direction of becoming distant from the optical system, and selects focused image data.

With this configuration, image data is acquired at the preset time interval while the end face the test object is moved in a direction of becoming distant from the optical system, and it is determined whether or not the image data is focused. Therefore, image data around a focal position can be acquired, and thus it is possible to acquire focused image data of an end face of a test object with a simple and inexpensive configuration.

According to the end face inspection apparatus of a fifteenth aspect of the present invention, in the end face inspection apparatus of the first aspect of the present invention, the control unit determines whether or not each piece of image data which is output from the image acquisition unit at a preset time interval is focused while the end face of the test object is moved in a direction of coming close to the optical system, and selects focused image data.

According to the end face inspection apparatus of a sixteenth aspect of the present invention, in the end face inspection apparatus of the twelfth aspect of the present invention, the control unit determines whether or not each piece of image data which is output from the image acquisition unit at a preset time interval is focused while the end face of the test object is moved in a direction of coming close to the optical system, and selects focused image data.

With this configuration, image data is acquired at the preset time interval while the end face of the test object is moved in a direction of coming close to the optical system, and it is determined whether or not the image data is focused. Therefore, image data around a focal position can be acquired, and thus it is possible to acquire focused image data of an end face of a test object with a simple and inexpensive configuration.

According to the end face inspection apparatus of a seventeenth aspect of the present invention, in the end face inspection apparatus of the first aspect of the present invention, the control unit determines whether or not each piece of image data which is output from the image acquisition unit at a preset time interval is focused while the end face of the test object is moved in a direction of coming close to the optical system and in a direction of becoming distant from the optical system, and selects focused image data.

According to the end face inspection apparatus of an eighteenth aspect of the present invention, in the end face inspection apparatus of the twelfth aspect of the present invention, the control unit determines whether or not each piece of image data which is output from the image acquisition unit at a preset time interval is focused while the end face of the test object is moved in a direction of coming close to the optical system and in a direction of becoming distant from the optical system, and selects focused image data.

With this configuration, image data is acquired at the preset time interval while the end face of the test object is moved in a direction of coming close to the optical system and in a direction of becoming distant from the optical system, and it is determined whether or not the image data is focused. Therefore, more image data around a focal position can be acquired, and thus it is possible to acquire focused image data of an end face of a test object with a simple and inexpensive configuration.

According to a nineteenth aspect of the present invention, there is provided a focused image data acquisition method for an end face inspection apparatus including an optical system which forms an image of an end face of a held test object on an image acquisition unit, focusing degree changing means for changing a distance between the end face of the test object and a focal position of the optical system, and a control unit which performs a process on image data acquired in the image acquisition unit, the method including a step of changing a distance between the end face of the test object and a focal position of the optical system; a step of acquiring a series of image data which is output from the image acquisition unit at a preset time interval while the distance between the end face of the test object and the focal position of the optical system is changed; a step of determining whether or not each of the series of acquired image data is focused; and a step of selecting image data determined as being focused as image data for end face inspection.

With this configuration, the image data is acquired at the preset time interval, and it is determined whether or not the image data is focused. Thus, if the optical system driving mechanism is operated, and a focal position is moved to the end face vicinity of the test object, image data around the focal position can be acquired, and thus it is possible to acquire focused image data of an end face of a test object with a simple and inexpensive configuration.

Advantage of the Invention

The present invention can provide an end face inspection apparatus which can easily acquire focused image data of an end face of a test object with a simple and inexpensive configuration.

BEST MODE FOR CARRYING OUT THE INVENTION

Hereinafter, with reference to the drawings, an end face inspection apparatus according to embodiments of the present invention will be described in detail.

First Embodiment

Figure 1:
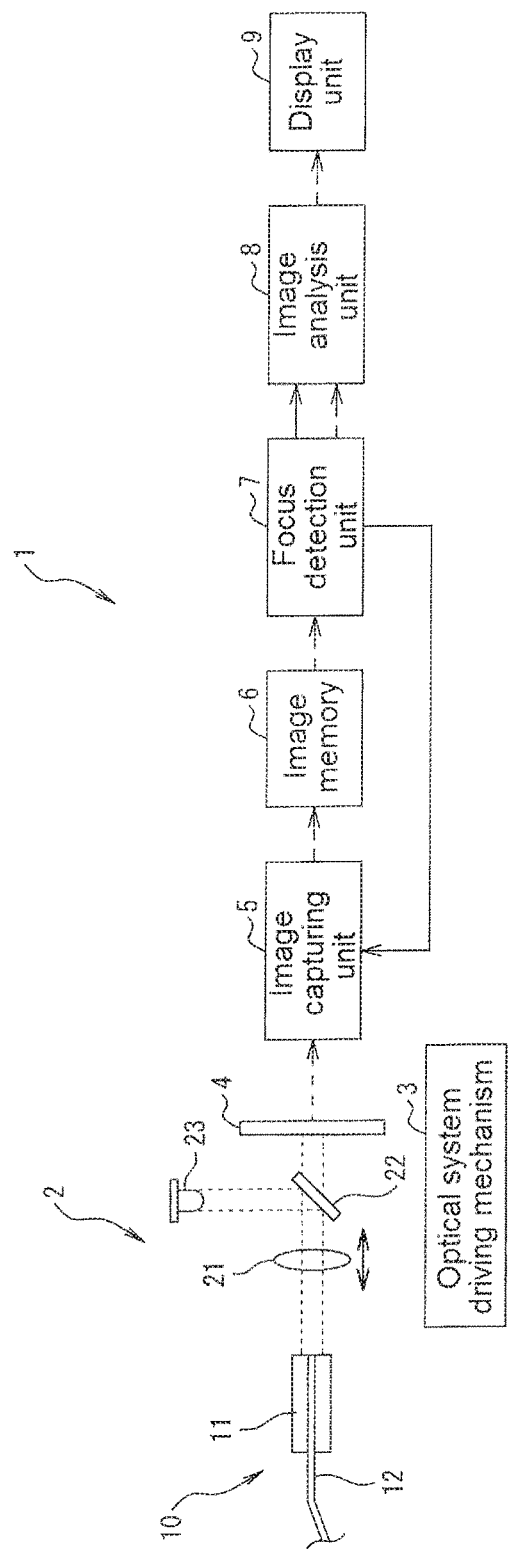
FIG. 1 is a schematic configuration diagram of an end face inspection apparatus according to a first embodiment of the present invention.

In FIG. 1, an end face inspection apparatus 1 according to a first embodiment of the present invention is configured to include an optical system 2, an optical system driving mechanism 3 as focusing degree changing means, an image sensor 4 as an image acquisition unit, an image capturing unit 5 and an image memory 6 and a focus detection unit 7 and an image analysis unit 8 as a control unit, and a display unit 9.

The end face inspection apparatus 1 of the present embodiment enlarges end faces of a ferrule 11 of an optical fiber cable 10 with an optical connector which is fixed to and held at a connector holding portion (not illustrated), and an optical fiber 12 enclosed in the ferrule 11, with the optical system 2, and images the end faces with the image sensor 4.

The optical system 2 includes a lens 21, a half mirror 22, and an illumination light emitting diode (LED) 23.

The lens 21 is provided to face end faces of the ferrule 11 and the optical fiber 12 of the optical fiber cable 10 held at the connector holding portion, and is provided so that an optical axis thereof is located on the substantially same axis as a central axis of the ferrule 11 and the optical fiber 12.

The lens 21 is moved in a direction which is parallel to the optical axis thereof by an operator operating the optical system driving mechanism 3, and thus the focus of an image formed on the image sensor 4 can be adjusted. In other words, the operator operates the optical system driving mechanism 3, and thus a distance between the end face of the optical fiber 12 and a focal position of the optical system 2 is changed.

The half mirror 22 is disposed on the rear side of the lens 21, and the end faces of the ferrule 11 and the optical fiber 12 are irradiated with illumination light from the illumination LED 23 through the lens 21. The illumination light applied to the end faces of the ferrule 11 and the optical fiber 12 is reflected at the end faces of the ferrule 11 and the optical fiber 12, and the reflected light is applied to the image sensor 4 through the lens 21 and the half mirror 22. The image sensor 4 converts the applied reflected light into image data which is then output.

The image capturing unit 5 acquires the image data output from the image sensor 4, and stores the image data in the image memory 6. The image memory 6 temporarily stores the image data.

The focus detection unit 7 reads the image data from the image memory 6 so as to detect whether or not the image data is in focus. The focus detection unit 7 transmits an image capturing command to the image capturing unit 5, and stores the image data in the image memory 6.

The focus detection unit 7 causes the image capturing unit 5 to store image data in the image memory 6 at a preset time interval (for example, an interval of 33 ms), and performs a focusing degree determination process of determining whether or not the image data is in focus.

Figure 2:
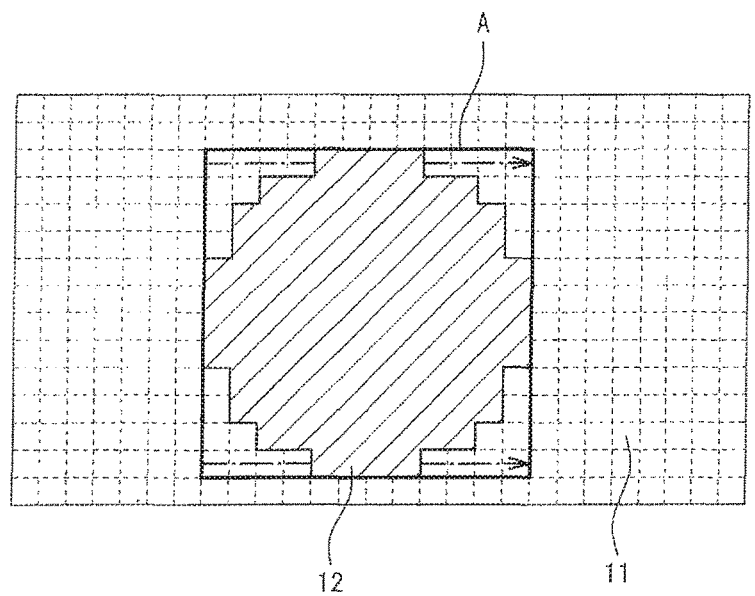
FIG. 2 is a diagram illustrating a focusing degree determination method for the end face inspection apparatus according to the first embodiment of the present invention.

The focus detection unit 7 performs image conversion on image data as illustrated in FIG. 2 through a filtering process. The focus detection unit 7 performs edge detection of a circular shape which is an end face shape of the optical fiber 12 as a test object, from the image data having undergone the image conversion through a process such as pattern matching.

In a case where the circular shape which is an end face shape of the optical fiber 12 as a test object is detected, the focus detection unit 7 calculates a luminance difference with adjacent pixels for image data of the circular shape as indicated by arrows in FIG. 2 with respect to only a peripheral portion of the detect circular shape as in a frame A in FIG. 2, and sets image data for which the luminance difference exceeds a threshold value as focused image data which is focused. One square of the grid in FIG. 2 indicates one pixel.

Figure 3:
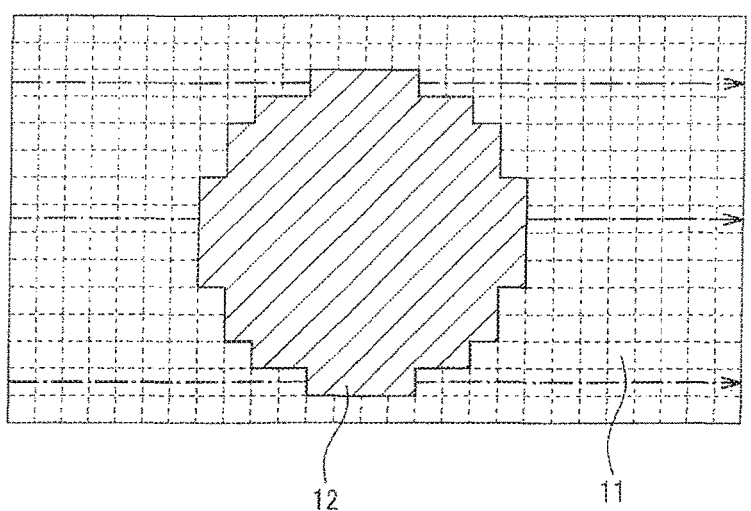
FIG. 3 is a diagram illustrating a focusing degree determination method for an end face inspection apparatus of the related art.

In a focusing degree determination process of the related art, as illustrated in FIG. 3, a luminance difference between pixels which are adjacent to each other is calculated as indicated by arrows in a transverse axis direction of acquired image data. In an in-focus state, changes in luminance values of pixels adjacent to each other increase. In an out-of-focus state, an image is blurred, and thus a luminance difference between pixels adjacent to each other is reduced. In the related art, a luminance difference between adjacent pixels is calculated for all pixels of acquired image data, and it is determined that an in-focus state occurs if the luminance difference exceeds a threshold value.

In this process, wrong detection may occur due to the influence of ambient noise (noise), or block noise or the like which is generated when a compressed image depending on a file format of image data is developed.

In a case of a configuration in which it cannot be detected whether or not the optical fiber cable 10 is inserted into the end face inspection apparatus 1, wrong detection is performed by performing a focusing degree determination process despite the optical fiber cable 10 not being inserted.

In the focusing degree determination process of the present embodiment, determination can be performed only when the optical fiber cable 10 is reliably inserted, without being influenced by noise.

If the focused image data which is focused is detected, the focus detection unit 7 outputs the image data to the image analysis unit 8.

The image analysis unit 8 examines to what extent an element such as a scratch, a stain, or dust is included in the ferrule 11 or the optical fiber 12 on the basis of the focused image data detected by the focus detection unit 7, so as to perform the quality of the end face thereof.

The display unit 9 displays an image of the end face of the ferrule 11 or the optical fiber 12, or a result of the end face quality determination, output from the image analysis unit 8. The display unit 9 is formed of an image display device such as a liquid crystal display.

Here, the end face inspection apparatus 1 is formed of a computer apparatus (not illustrated). The computer apparatus includes a central processing unit (CPU), a read only memory (ROM), a random access memory (RAM), a hard disk device, input and output ports, and an operation input device (hard keys, a touch panel, and the like) (none illustrated).

Programs causing the computer apparatus to function as the end face inspection apparatus 1 are stored in the ROM and the hard disk device of the computer apparatus. In other words, the CPU executes the program stored in the ROM by using the RAM as a work region, and thus the computer apparatus functions as the end face inspection apparatus 1.

As mentioned above, in the present embodiment, the focus detection unit 7 and the image analysis unit 8 are formed by the CPU.

In a case where the end faces of the ferrule 11 and the optical fiber 12 of the optical fiber cable 10 are inspected in the end face inspection apparatus 1 with this configuration, if power is supplied to the end face inspection apparatus 1 (a test object is not attached yet), the focus detection unit 7 causes the image capturing unit 5 to store image data in the image memory 6 at a preset time interval, and starts a focusing degree determination process on each piece of the stored image data. In this case, the focus detection unit 7 cannot detect a circular shape which is an end face shape of the optical fiber 12 as a test object from the image data, and thus does not perform a process such as calculation of a luminance difference and outputs the image data to the image analysis unit 8. The image data which is sequentially incorporated is forward without being changed so as to be displayed on the display unit 9 except for the time when a determination result which will be described later and focused image data are displayed together.

In this state, the optical fiber cable 10 with the optical connector is fixed to and held at the connector holding portion, and the optical system driving mechanism 3 is operated by the operator. For example, the lens 21 is moved from end to end of a movable range thereof by the optical system driving mechanism 3. The focus detection unit 7 detects a circular shape which is an end face shape of the optical fiber 12 as a test object from the image data during that time, and the circular shape is detected from the image data around a position of the lens 21 focused on the end faces of the ferrule 11 and the optical fiber 12 of the optical fiber cable 10.

If it is determined that the circular shape which is an end face shape of the optical fiber 12 as a test object is detected from the image data, and an in-focus state occurs in a focusing degree determination process, the focus detection unit 7 outputs the image data to the image analysis unit 8, and transmits an image analysis command to the image analysis unit 8. If the image analysis command is received from the focus detection unit 7, the image analysis unit 8 determines the quality of the end face on the basis of the image data which is input from the focus detection unit 7, and displays the focused image data on the display unit 9 along with a result thereof.

As mentioned above, since the focusing degree determination process of determining whether or not each of a series of image data which is incorporated at a preset time interval is focused is performed, the lens 21 is only moved to the vicinity of being focused on the end face as a test object by the optical system driving mechanism 3, so that image data focused on the end face as a test object can be acquired, and thus a quality determination result can be obtained.

In the above-described example, the lens 21 is moved from end to end of the movable range thereof, but the lens 21 may be moved to the vicinity of being focused while referring to image data incorporated by the image sensor 4 on the display unit 9.

In the above-described example, the focus detection unit 7 acquires image data, and performs a focusing degree determination process from the time at which power is supplied to the end face inspection apparatus 1, but there may be a configuration in which a switch or the like for causing the focusing degree determination process to be performed is provided, and acquisition of image data or the focusing degree determination process is performed only when the switch is turned on. A sensor detecting whether or not the optical system driving mechanism 3 is operated may be provided, and acquisition of image data or the focusing degree determination process may be performed only while the optical system driving mechanism 3 is operated.

As described above, the end face inspection apparatus of the present embodiment includes the optical system 2 which forms an image of an end face of a test object fixed to a predetermined position, at a position of the image sensor 4; the optical system driving mechanism 3 which moves a focal position of the optical system through an operator's operation; and the focus detection unit 7 which acquires image data output from the image sensor at a preset time interval and determines whether or not the image data is focused.

With this configuration, the image data is acquired at the preset time interval, and it is determined whether or not the image data is focused. Thus, if the optical system driving mechanism is operated, and a focal position is moved to the end face vicinity of the test object, image data around the focal position can be acquired, and thus it is possible to acquire focused image data of an end face of a test object with a simple and inexpensive configuration.

In the end face inspection apparatus of the present embodiment, the focus detection unit determines whether or not an in-focus state occurs on the basis of part of the image data.

With this configuration, it is determined whether or not an in-focus state occurs by referring to part of the image data. Thus, it is possible to reduce a processing load compared with a case where it is determined whether or not an in-focus state occurs by referring to all of image data.

In the end face inspection apparatus of the present embodiment, the focus detection unit detects a shape of the end face of the test object from the image data, and determines whether or not an in-focus state occurs on the basis of a peripheral portion of the shape in a case where the shape is detected.

With this configuration, a shape of the end face is detected from image data, and it is determined whether or not an in-focus state occurs on the basis of a peripheral portion of the shape in a case where the shape is detected. Thus, it is possible to reduce the influence of noise compared with a case where it is determined whether or not an in-focus state occurs by referring to all of image data, and it is possible to determine whether or not an in-focus state occurs only in a case where a test object is present.

In the end face inspection apparatus of the present embodiment, the focus detection unit determines whether or not image data which is output from the image sensor at a preset time interval is focused only while the optical system driving mechanism is operated.

With this configuration, it is determined whether or not image data is focused at a preset time interval only while the optical system driving mechanism is operated. Thus, it is possible to restrict the time for determination of an in-focus state and thus to reduce a processing load.

In a focused image data acquisition method for an end face inspection apparatus of the present embodiment including the optical system 2 which forms an image of an end face of a test object fixed to a predetermined position, at a position of the image sensor 4 and the optical system driving mechanism 3 which moves a focal position of the optical system through an operator's operation, the method includes a step of causing the image sensor to acquire image data at a preset time interval, and a step of determining whether or not the image data is focused.

With this configuration, the image data is acquired at the preset time interval, and it is determined whether or not the image data is focused. Thus, if the optical system driving mechanism is operated, and a focal position is moved to the end face vicinity of the test object, image data around the focal position can be acquired, and thus it is possible to acquire focused image data of an end face of a test object with a simple and inexpensive configuration.

Second Embodiment

Hereinafter, with reference to the drawings, an end face inspection apparatus according to a second embodiment of the present invention will be described in detail. The present embodiment is roughly different from the first embodiment in terms of a configuration focusing degree changing means. In the present embodiment, contrary to the first embodiment, an end face of a test object is moved relative to a fixed focal position.

Figure 4:
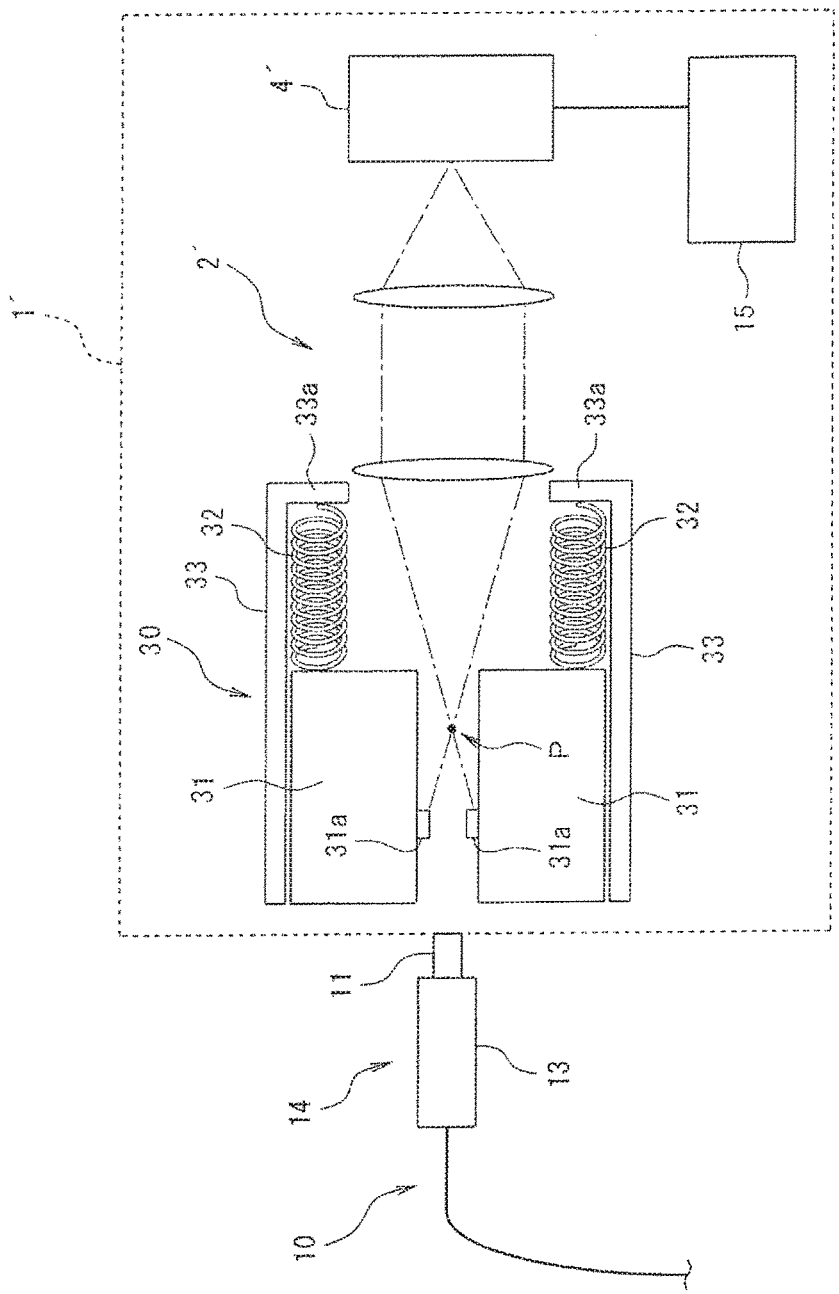
FIG. 4 is a schematic configuration diagram of an end face inspection apparatus according to a second embodiment of the present invention.

In FIG. 4, an end face inspection apparatus 1' according to the second embodiment of the present invention is configured to include a connector holding portion 30 (simply referred to as a holding portion) a focusing degree changing means, a lens unit 2' as an optical system, a camera 4' as an image acquisition unit, and a control unit 15.

The end face inspection apparatus 1' of the present embodiment enlarges end faces of a ferrule 11 of an optical fiber cable 10 with an optical connector 14 which is held at the connector holding portion 30, and an optical fiber (not illustrated) enclosed in the ferrule 11, with the lens unit 2', and images the end faces with the camera 4'. A plug housing 13 for connection and fixation is mounted on the circumference of the ferrule 11.

Thus, the lens unit 2' is provided to face an end face of the ferrule 11 of the optical connector 14 held at the connector holding portion 30, and is provided so that an optical axis thereof is located on the substantially same axis as a central axis of the ferrule 11.

The camera 4' is provided on an opposite side to the lens unit 2' side facing the connector holding portion 30, and an image which is focused on a focus plane at a focal position indicated by P in the figure inside the connector holding portion 30 separated by a predetermined distance from the lens unit 2' is formed on imaging elements of the camera 4'.

The connector holding portion 30 includes a connector receiving portion 31, springs 32 as elastic members, and a housing 33. The connector holding portion 30 holds the optical fiber cable 10 with the optical connector 14 so as to be movable in a predetermined direction.

Figure 5:
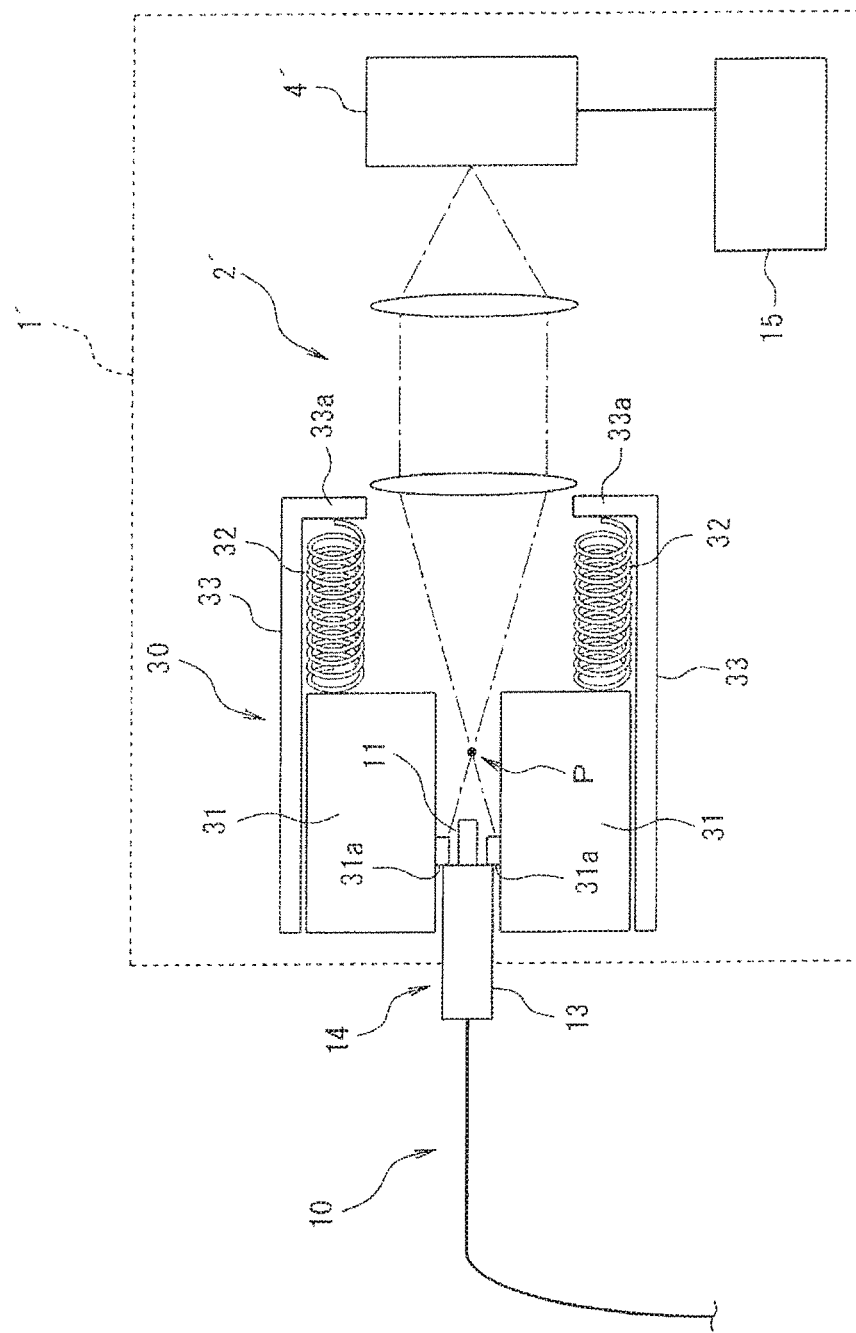
FIG. 5 is a schematic configuration diagram illustrating a state in which an optical connector is inserted into a connector receiving portion of the end face inspection apparatus according to the second embodiment of the present invention.

The connector receiving portion 31 is formed, for example, in a substantially cylindrical shape, and an inner circumferential part of the connector receiving portion 31 is formed in a size so that the optical connector 14 can be inserted thereinto. A protrusion 31a is formed on an inner circumferential surface of the connector receiving portion 31. The protrusion 31a is formed, as illustrated in FIG. 5, so that the ferrule 11 of a central part of the optical connector 14 can be inserted thereto, but the plug housing 13 mounted on the outside of the ferrule 11 cannot be inserted thereinto (stopped). The connector receiving portion 31 holds the optical connector 14 which is inserted until the plug housing 13 is stopped at the protrusion 31a, at that position even if the insertion force is released. The connector receiving portion 31 is configured to be replaceable for each type of shape so as to cope with various shapes of the optical connector 14.

The housing 33 is formed, for example, in a substantially cylindrical shape, and an engagement portion 33a which projects toward the inner circumferential side is formed on an inner circumferential part on the side facing the lens unit 2'. A hole is formed in an inner circumferential part of the engagement portion 33a so that an image of the end face of the ferrule 11 of the optical connector 14 held at the connector holding portion 30 is formed on the imaging elements of the camera 4'.

Compression springs 32 are provided on a surface of the engagement portion 33a on an opposite side to the surface of the inner circumferential part of the housing 33 facing the lens unit 2', and the compression springs 32 are fixed to the surface of the engagement portion 33a on the opposite side to the surface facing the lens unit 2' so as to expand and contract in a direction in which the optical axis of the lens unit 2' extends. The connector receiving portion 31 is fitted to the housing 33 on an opposite side to the engagement portion 33a of the compression spring 32 so as to be movable in the expansion/contraction direction of the compression spring 32.

In other words, the connector receiving portion 31 can be moved toward the lens unit 2' inside the housing 33 while receiving the elastic force from the compression springs 32 disposed on the lens unit 2' side. For example, when the pressing force of the compression springs 32 is released after the compression springs 32 are compressed and becomes immovable in the direction of the lens unit 2', the connector receiving portion 31 is moved by the elastic force of the compression springs 32 in the opposite direction to the lens unit 2' at a predetermined speed.

Figure 6:
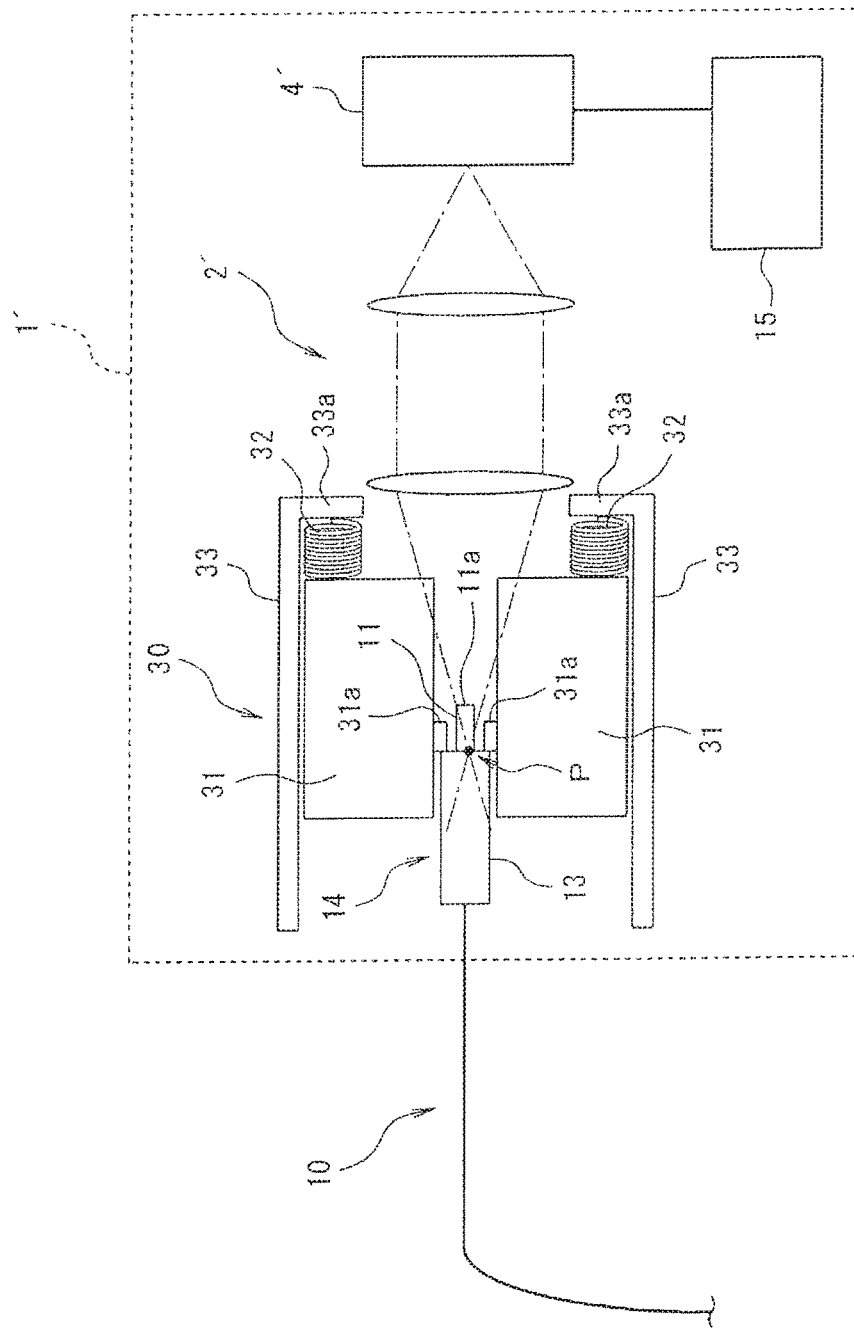
FIG. 6 is a schematic configuration diagram illustrating a state in which the optical connector is inserted into the connector receiving portion of the end face inspection apparatus according to the second embodiment of the present invention, and is pushed thereinto until the spring contracts.

In a state in which the optical connector 14 is further pushed inward in the direction of the lens unit 2', and thus the compression springs 32 are compressed and becomes immovable in the direction of the lens unit 2', from a state in which the ferrule 11 of the optical connector 14 is inserted into the protrusion 31a of the connector receiving portion 31, and the plug housing 13 is stopped at the protrusion 31a, as illustrated in FIG. 6, the focal position of the lens unit 2' indicated by P in the figure is located farther from the lens unit 2' than an end face 11a of the ferrule 11.

In other words, when the optical connector 14 is further pushed inward in the direction of the lens unit 2' from the state in which the ferrule 11 of the optical connector 14 is inserted into the protrusion 31a of the connector receiving portion 31, and the plug housing 13 is stopped at the protrusion 31a, the end face 11a of the ferrule 11 necessarily passes through the focal position (in the figure, indicated by P) of the lens unit 2'.

The end face 11a of the ferrule 11 necessarily passes through the focal position (in the figure, indicated by P) of the lens unit 2' in a case where the optical connector 14 is further pushed inward in the direction of the lens unit 2' until the compression springs 32 are compressed and are immovable in the direction of the lens unit 2' from the state in which the ferrule 11 of the optical connector 14 is inserted into the protrusion 31a of the connector receiving portion 31, and the plug housing 13 is stopped at the protrusion 31a, and then the pressing force is released so that the connector receiving portion 31 is returned to the initial position. In other words, a distance between the end face 11a of the ferrule 11 and the fixed focal position P is changed by the connector holding portion 30 while controlling a movement direction of the optical connector 14.

The control unit 15 is formed of a computer unit including a central processing unit (CPU), a read only memory (ROM), a random access memory (RAM), a hard disk device, and input and output ports (none illustrated).

Programs causing the computer unit to function as the control unit 15 are stored in the ROM and the hard disk device of the computer unit along with various control constants, various maps, or the like. In other words, the CPU executes the programs stored in the ROM and the hard disk device, and thus the computer unit functions as the control unit 15. The camera 4' is connected to the input and output ports of the control unit 15.

The control unit 15 acquires image data captured by the camera 4' at a preset time interval (for example, an interval of 33 ms). The control unit 15 sequentially analyzes a series of the acquired image data, and selects image data in an in-focus state as focused image data of the end face 11a. It is inspected whether or not the end face 11a is scratched or stained on the basis of the selected image data. The inspection of the end face 11a based on the image data may be performed by the control unit 15, may be performed other control units of the end face inspection apparatus 1', and an external device of the end face inspection apparatus 1'.

The control unit 15 determines whether or not an in-focus state occurs, for example, on the basis of contrast of image data. The control unit 15 may determine that an in-focus state occurs if a contrast value of image data is equal to or greater than a preset threshold value, and may analyze changes in contrast values of image data which is sequentially acquired, and may determine that image data having the greatest contrast value is focused.

The control unit 15 may start acquisition of image data and determination of an in-focus state from the supply of power, and may perform the acquisition and the determination until focused image data is detected, and may continuously perform the acquisition and the determination until the supply of power is stopped. A switch or the like may be provided, and the acquisition and the determination may be started or finished by operating the switch or the like. A sensor which detects that the optical connector 14 is inserted into the connector holding portion 30 may be provided, and the acquisition and the determination may be started when it is detected by the sensor that the optical connector 14 is inserted into the connector holding portion 30, and may be finished when it is detected that optical connector 14 is extracted from the connector holding portion 30.

In the end face inspection apparatus 1', in a case where the end face 11a of the ferrule 11 of the optical connector 14 is inspected, as illustrated in FIG. 5, the optical connector 14 is inserted into the connector holding portion 30, and the optical connector 14 is pushed inward in the direction of the lens unit 2', and is then pushed inward until the compression springs 32 are compressed and are immovable in the direction of the lens unit 2' (forward route), as illustrated in FIG. 6.

Here, the connector holding portion 30 is free from the pushing force in the direction of the lens unit 2', the connector holding portion 30 is moved until returning to the initial position in the direction (the leftward direction in the figure) of becoming distant from the lens unit 2' at a predetermined speed by the force (elastic force) of returning the compression springs 32 to the original state (backward route).

In the backward route, the control unit 15 acquires image data captured by the camera 4' at a preset time interval, sequentially analyzes the acquired image data, and selects image data in an in-focus state as focused image data of the end face 11a. The reason of using the backward route is that there is a high probability that data may be stably acquired in the backward route (a push-in speed differs for each user, but return is performed by the compression springs and thus a speed is relatively stabilized in the backward route).

As mentioned above, since the connector holding portion is moved to pass through the focal position at a predetermined speed by the compression springs 32, and it is determined whether or not image data captured by the camera 4' at a preset time interval is focused during that time, image data of the end face 11a of the ferrule 11 around the focal position of the lens unit 2' can be acquired, and thus it is possible to acquire focused image data of the end face 11a of the ferrule 11 with a simple and inexpensive configuration.

A movement speed of the connector receiving portion 31 due to the compression springs 32 and an acquisition time interval of image data in the control unit 15 are adjusted and set so that image data around the focal position of the lens unit 2' can be acquired.

Even when the optical connector 14 is pushed inward in the direction of the lens unit 2' (forward route), the control unit 15 may determine whether or not image data captured by the camera 4' at a preset time interval is focused.

In the above-described way, there are two chances to obtain image data of the end face 11a of the ferrule 11 around the focal position of the lens unit 2', and thus it is possible to reliably obtain focused image data of the end face 11a of the ferrule 11.

In the present embodiment, the spring is used as an elastic member, but this is only an example.

In the present embodiment, the connector receiving portion 31 is moved by the elastic force obtained when the compression springs 32 are compressed, but the connector receiving portion 31 may be moved by tension springs. Specifically, the engagement portion 33a is also provided on the optical connector 14 side (33b), and tension springs are provided between the engagement portion 33b and the connector receiving portion 31 (not illustrated).

In the present embodiment, the connector holding portion 30 or the connector receiving portion 31 has a cylindrical shape, but is not limited thereto, and may have an angular rectangular cylindrical shape, and may have a shape divided into a plurality of parts in the optical axis direction of the lens unit 2'.

There may be a configuration in which either one of the end face inspection apparatus 1' and the optical connector 14 may be moved. In other words, there may be any configuration in which the optical connector 14 is inserted into the stationary end face inspection apparatus 1', and the end face inspection apparatus 1' advances toward the stationary the optical connector 14. This is also the same for the above-described first embodiment.

As described above, the end face inspection apparatus of the present embodiment includes the image acquisition unit 4' which outputs image data obtained through conversion in an imaging element; the optical system 2' which forms an image focused on a focal position separated by a predetermined distance, at a position of the imaging element; the holding portion 30 which holds an end face of a test object on an optical axis of the optical system so that the end face faces the optical system, and moves the end face to pass through the focal position in an optical axis direction of the optical axis at a predetermined speed due to the elastic force of the elastic member 32; and the control unit 15 which determines whether or not image data which is output from the image acquisition unit at a preset time interval is focused while the end face is moved by the elastic force of the elastic member at the predetermined speed, and acquires focused image data of the end face.

With this configuration, the end face of the test object is moved to pass through a focal position at a predetermined speed, and image data is acquired at a preset time interval and it is determined whether or not the image data is focused during that time. Therefore, image data around a focal position can be acquired, and thus it is possible to acquire focused image data of an end face of a test object with a simple and inexpensive configuration.

In the end face inspection apparatus of the present embodiment, the control unit determines whether or not image data which is output from the image acquisition unit at the preset time interval is focused while the end face is moved in a direction of becoming distant from the optical system, and acquires focused image data of the end face.

With this configuration, image data is acquired at the preset time interval while the end face is moved in a direction of becoming distant from the optical system, and it is determined whether or not the image data is focused. Therefore, image data around a focal position can be acquired, and thus it is possible to acquire focused image data of an end face of a test object with a simple and inexpensive configuration.

In the end face inspection apparatus of the present embodiment, the control unit determines whether or not image data which is output from the image acquisition unit at a preset time interval is focused while the end face is moved in a direction of coming close to the optical system, and acquires focused image data of the end face.

With this configuration, image data is acquired at the preset time interval while the end face is moved in a direction of coming close to the optical system, and it is determined whether or not the image data is focused. Therefore, image data around a focal position can be acquired, and thus it is possible to acquire focused image data of an end face of a test object with a simple and inexpensive configuration.

As described above, in the focused image data acquisition method for the end face inspection apparatus of the present embodiment including the image acquisition unit 4' which outputs image data obtained through conversion in an imaging element, the optical system 2' which forms an image focused on a focal position separated by a predetermined distance, at a position of the imaging element, and the holding portion 30 which holds an end face of a test object on an optical axis of the optical system so that the end face faces the optical system, and moves the end face to pass through the focal position in an optical axis direction of the optical axis at a predetermined speed due to the elastic force of the elastic member 32, the method includes a step of the image acquisition unit to acquire image data at a preset time interval while the end face is moved by the elastic force of the elastic member at the predetermined speed, and a step of determining whether or not the image data is focused and acquiring focused image data of the end face.

With this configuration, the end face of the test object is moved to pass through a focal position at a predetermined speed, and image data is acquired at a preset time interval and it is determined whether or not the image data is focused during that time. Therefore, image data around a focal position can be acquired, and thus it is possible to acquire focused image data of an end face of a test object with a simple and inexpensive configuration.

As mentioned above, in the first and second embodiments, a description has been made of a case where end faces of a ferrule and an optical fiber are inspected, but this is only an example, and, for example, the present invention is also applicable to a case where an end face of a solid member is inspected.

The first and second embodiments have been disclosed, but it is clear that a person skilled in the art may add modifications thereto without departing from the scope of the present invention. Such all alterations and equivalents thereof are intended to fall within the claims.

DESCRIPTION OF REFERENCE NUMERALS AND SIGNS

1 AND 1' END FACE INSPECTION APPARATUS, 2 OPTICAL SYSTEM, 2' LENS UNIT (OPTICAL SYSTEM), 3 OPTICAL SYSTEM DRIVING MECHANISM (FOCUSING DEGREE CHANGING MEANS), 4 IMAGE SENSOR (IMAGE ACQUISITION UNIT), 4' CAMERA (IMAGE ACQUISITION UNIT), 7 FOCUS DETECTION UNIT, 15 CONTROL UNIT, 21 LENS, 22 HALF MIRROR, 23 ILLUMINATION LED, 30 CONNECTOR HOLDING PORTION (FOCUSING DEGREE CHANGING MEANS), 31 CONNECTOR RECEIVING PORTION, 31a PROTRUSION, 32 COMPRESSION SPRING (ELASTIC MEMBER), 33 HOUSING, 33a ENGAGEMENT PORTION

What is claimed is:

1. An end face inspection apparatus including an optical system which forms an image of an end face of a held test object on an image acquisition unit, and inspecting the end face of the test object by using acquired image data, the apparatus comprising:
    focusing degree changing means for changing a distance between the end face of the test object and a focal position of the optical system; and
    a control unit that acquires a series of image data which is output from the image acquisition unit at a preset time interval while the distance between the end face of the test object and the focal position of the optical system is changed by the focusing degree changing means, determines whether or not each piece of the image data is focused, and selects focused image data as image data for end face inspection.

2. The end face inspection apparatus according to claim 1, wherein the test object is fixed to and held at a predetermined position, and
    wherein the focusing degree changing means is formed of an optical system driving mechanism that moves the focal position of the optical system through an operator's operation.

3. The end face inspection apparatus according to claim 1, wherein the control unit determines whether or not an in-focus state occurs by using part of the image data.

4. The end face inspection apparatus according to claim 2, wherein the control unit determines whether or not an in-focus state occurs by using part of the image data.

5. The end face inspection apparatus according to claim 3, wherein the control unit detects a shape of the end face of the test object from the image data, and determines whether or not an in-focus state occurs by using a peripheral portion of the shape in a case where the shape is detected.

6. The end face inspection apparatus according to claim 4, wherein the control unit detects a shape of the end face of the test object from the image data, and determines whether or not an in-focus state occurs by using a peripheral portion of the shape in a case where the shape is detected.

7. The end face inspection apparatus according to claim 2, wherein the control unit determines whether or not each piece of the image data which is output from the image acquisition unit at a preset time interval is focused only while the optical system driving mechanism is operated.

8. The end face inspection apparatus according to claim 3, wherein the control unit determines whether or not each piece of the image data which is output from the image acquisition unit at a preset time interval is focused only while the optical system driving mechanism is operated.

9. The end face inspection apparatus according to claim 4, wherein the control unit determines whether or not each piece of the image data which is output from the image acquisition unit at a preset time interval is focused only while the optical system driving mechanism is operated.

10. The end face inspection apparatus according to claim 5, wherein the control unit determines whether or not each piece of the image data which is output from the image acquisition unit at a preset time interval is focused only while the optical system driving mechanism is operated.

11. The end face inspection apparatus according to claim 6, wherein the control unit determines whether or not each piece of the image data which is output from the image acquisition unit at a preset time interval is focused only while the optical system driving mechanism is operated.

12. The end face inspection apparatus according to claim 1, wherein the focusing degree changing means is formed of a holding portion that holds the end face of the test object to face the optical system on an optical axis of the optical system, and moves the end face to pass through the focal position in an optical axis direction of the optical axis at a predetermined speed by using the elastic force of an elastic member.

13. The end face inspection apparatus according to claim 1, wherein the control unit determines whether or not each piece of image data which is output from the image acquisition unit at a preset time interval is focused while the end face of the test object is moved in a direction of becoming distant from the optical system, and selects focused image data.

14. The end face inspection apparatus according to claim 12, wherein the control unit determines whether or not each piece of image data which is output from the image acquisition unit at a preset time interval is focused while the end face of the test object is moved in a direction of becoming distant from the optical system, and selects focused image data.

15. The end face inspection apparatus according to claim 1,
wherein the control unit determines whether or not each piece of image data which is output from the image acquisition unit at a preset time interval is focused while the end face of the test object is moved in a direction of coming close to the optical system, and selects focused image data.

16. The end face inspection apparatus according to claim 12,
wherein the control unit determines whether or not each piece of image data which is output from the image acquisition unit at a preset time interval is focused while the end face of the test object is moved in a direction of coming close to the optical system, and selects focused image data.

17. The end face inspection apparatus according to claim 1,
wherein the control unit determines whether or not each piece of image data which is output from the image acquisition unit at a preset time interval is focused while the end face of the test object is moved in a direction of coming close to the optical system and in a direction of becoming distant from the optical system, and selects focused image data.

18. The end face inspection apparatus according to claim 12,
wherein the control unit determines whether or not each piece of image data which is output from the image acquisition unit at a preset time interval is focused while the end face of the test object is moved in a direction of coming close to the optical system and in a direction of becoming distant from the optical system, and selects focused image data.

19. A focused image data acquisition method for an end face inspection apparatus including an optical system which forms an image of an end face of a held test object on an image acquisition unit, focusing degree changing means for changing a distance between the end face of the test object and a focal position of the optical system, and a control unit which performs a process on image data acquired in the image acquisition unit, the method comprising:
a step of changing a distance between the end face of the test object and a focal position of the optical system;
a step of acquiring a series of image data which is output from the image acquisition unit at a preset time interval while the distance between the end face of the test object and the focal position of the optical system is changed;
a step of determining whether or not each of the series of acquired image data is focused; and
a step of selecting image data determined as being focused as image data for end face inspection.

* * * * *